Oct. 11, 1938.    E. G. MUELLER    2,132,994
BRAKE MECHANISM
Filed May 7, 1937    2 Sheets-Sheet 2

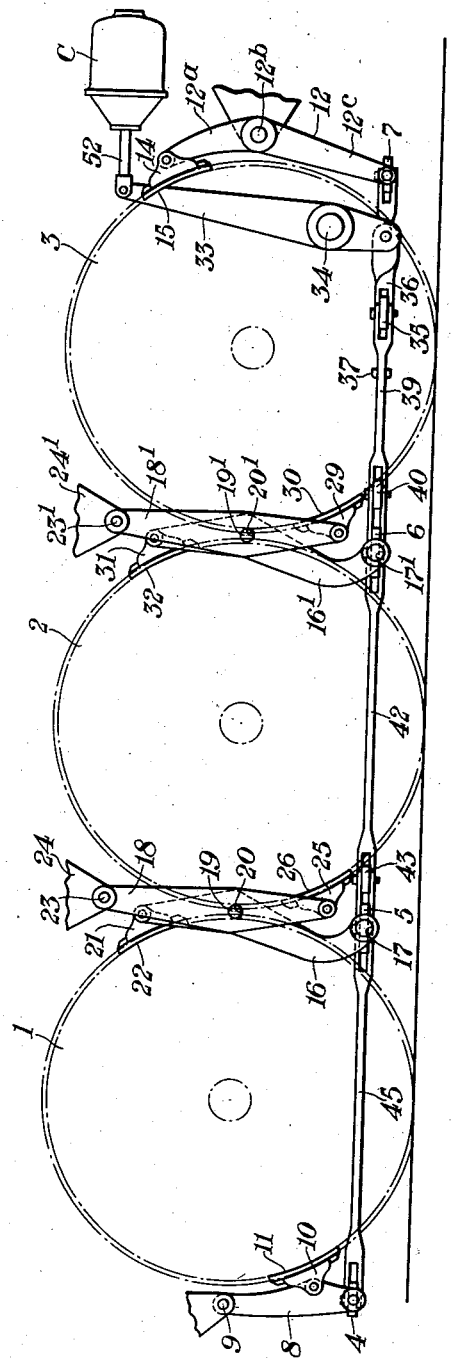

INVENTOR
Emil G. Mueller.
BY
HIS ATTORNEY

Patented Oct. 11, 1938

2,132,994

UNITED STATES PATENT OFFICE 2,132,994

BRAKE MECHANISM

Emil G. Mueller, Swissvale, Pa., assignor to The American Brake Company, Swissvale, Pa., a corporation of Missouri Application May 7, 1937, Serial No. 141,315

10 Claims. (Cl. 188—46)

My invention relates to brake mechanism, and particularly to improvements in brake mechanism of the type described and claimed in an application for Letters Patent of the United States, Serial No. 60,535, filed by Norman W. Tilley, on January 23, 1936, for Locomotive driver brakes.

One object of my invention is to provide a brake hanger assembly capable of supporting two brake shoes, one for engaging each of two adjacent driving wheels, which hanger assembly shall be so constructed that the minimum permissible spacing between the driving wheels need be no greater than that required for the wheels to clear themselves.

Other objects and characteristic features of my invention will appear as the description proceeds.

I shall describe one form of brake mechanism embodying my invention, and shall then point out the novel features thereof in claims.

Figure 3:
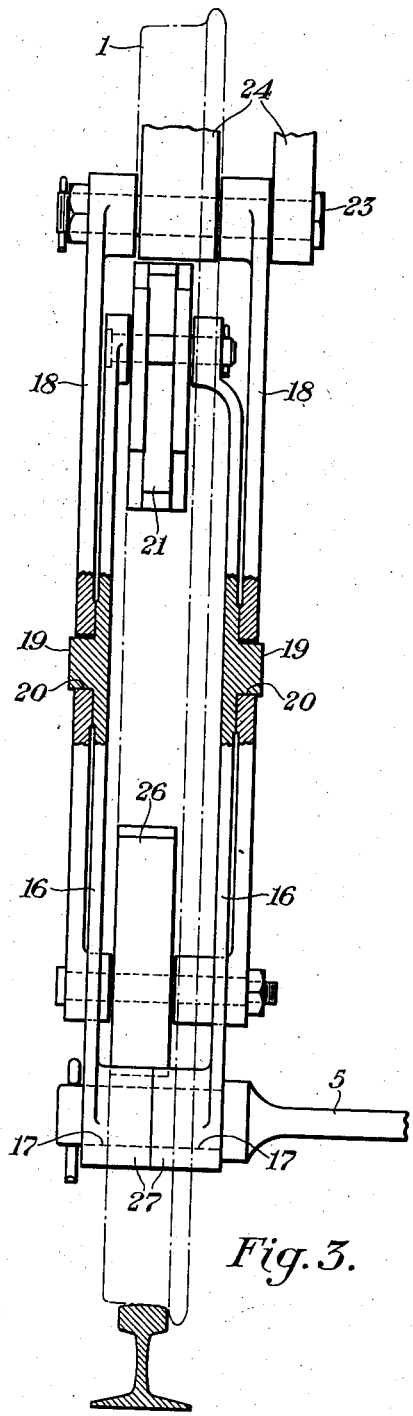
Figure 4:
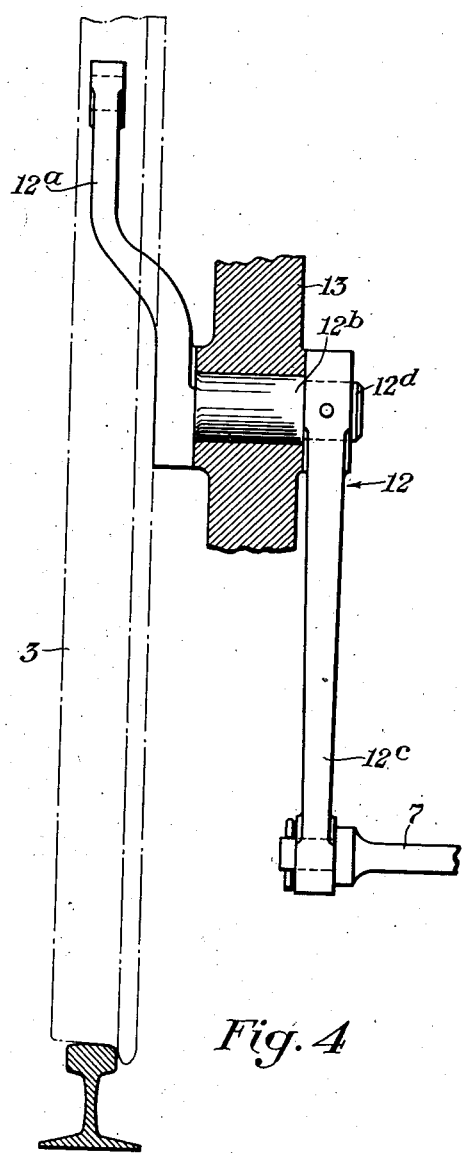

In the accompanying drawings, Fig. 1 is a view, partly diagrammatic and partly in side elevation, showing one form of brake mechanism embodying my invention applied to the driving wheels of a locomotive having three pairs of driving wheels. Fig. 2 is a plan view of the brake rigging employed in the brake mechanism shown in Fig. 1. Fig. 3 is a side view of one of the hanger assemblies forming part of the brake mechanism shown in the preceding views. Fig. 4 is a side view of one of the hanger levers 12 forming part of the brake mechanism shown in the preceding views.

Similar reference characters refer to similar parts in each of the several views.

Referring to the drawings, I have here shown brake mechanism embodying my invention arranged for use in connection with the driving wheels 1, 2, and 3 of a locomotive of the type having three pairs of driving wheels located as closely together as the necessary clearance between the wheels themselves will permit in order to decrease the overall length of the locomotive, and thus facilitate the negotiation of curves by the locomotive, the various parts of the locomotive other than the driving wheels being omitted from the drawings to simplify the disclosure.

The brake mechanism comprises a brake beam 4 which extends transversely of the locomotive at the left-hand side of the wheels 1, a brake beam 5 which extends transversely of the locomotive between the wheels 1 and 2, a brake beam 6 which extends transversely of the locomotive between the wheels 2 and 3, and a brake beam 7 which extends transversely of the locomotive at the right-hand side of the wheels 3. The brake beams are all located in the same horizontal plane, which plane is disposed considerably below the horizontal plane passing through the centers of the wheels.

The brake beam 4 is supported for movement between a brake applying and a brake releasing position by means of a pair of hanger levers 8, the upper ends of which are pivotally secured to the locomotive frame by means of pins 9, and the lower ends of which are pivotally connected with the opposite ends of the brake beam, only one of the levers 8 being shown in the drawings. Secured to each of the levers 8 intermediate its ends is a brake head 10 carrying a brake shoe 11 which, when the brake beam 4 is moved to its brake applying position, is adapted to engage the tread of the wheel 1 in a zone located some distance below the horizontal plane passing through the axis of the wheel.

The brake beam 7 is supported for movement between a brake applying and a brake releasing position by means of two hanger levers 12, one of which is located at each side of the locomotive. Only one of the hanger levers 12 is shown in the drawings, and as best seen in Fig. 4, this hanger lever comprises an upwardly extending arm 12ª, the upper end of which is formed with an offset portion which extends into the plane of the wheels at one side of the adjacent wheel 3, and the lower end of which is formed integrally with a shaft 12ᵇ. The shaft 12ᵇ is journaled in a suitable bearing 13 formed in the locomotive frame, and is provided at the end opposite to the arm 12ª with a reduced portion 12ᵈ to which a depending arm 12ᶜ is secured. Each arm 12ᶜ is disposed some distance inside of the plane of the wheels, as will be apparent from an inspection of Fig. 4, and the lower ends of these arms are pivotally connected with the brake beam 7 in supporting relation thereto at the opposite ends of the brake beam. The arms 12a are each provided at their upper ends with a brake head 14 carrying a brake shoe 15 which, when the brake beam 7 is moved to its brake applying position, is adapted to engage the tread of the wheel 3 in a zone located approximately the same distance above the horizontal plane passing through the axis of the wheels 3, that the zone in which the shoes 11 are adapted to engage the wheels 1 is located below the plane passing through the axis of the wheels 1.

The brake beam 5 is supported at each end for movement between a brake applying and a brake releasing position by means of a hanger assembly comprising a pair of hanger levers 16 which extend downwardly on opposite sides of the closest portions of the adjacent wheels 1 and 2 with considerable clearance in the manner shown in Figs. 1 and 3, and which are each provided at their lower ends with a hole 17 for the reception of the rounded end of the brake beam 5. The hanger levers 16 are pivotally secured intermediate their ends to a second pair of hanger levers 18 intermediate their ends by means of trunnions 19 which are formed integral with the levers 16, and which extend through clearance holes 20 formed in the levers 18; and pivotally supported by the levers 16 at their upper ends are brake heads 21 carrying brake shoes 22 which are adapted to engage the treads of the wheels 1 in zones located diametrically opposite to the zones in which the shoes 11 are adapted to engage the wheels 1. The hanger levers 18 of each pair are disposed in planes located outside of the planes of the contiguous hanger levers 16, and are pivotally supported at their upper ends by means of pins or bolts 23 mounted in spaced lugs 24 formed on the locomotive frame. The lower ends of the levers 18 have pivotally secured thereto brake heads 25 carrying brakes shoes 26 which are adapted to engage the wheels 2 in zones which are located the same distance below the axis of the wheels 2 as the zones in which the shoes 11 carried by the hanger levers 8 are adapted to engage the wheels 1. The proper spacing between the levers 16 at their lower ends is maintained by means of bosses 27 formed on the levers, while the proper spacing between these levers at their upper ends is maintained by the associated brake head 21. The spacing between the levers 18 at their upper ends is maintained by one of the lugs 24, and at their lower ends by the associated brake head 25. The distance which the outer levers 16 and 18 of each hanger assembly is spaced from the outer faces of the associated wheels is not sufficient to interfere with the side rods of the locomotive.

The brake beam 6 is supported at each end for movement between a brake applying and a brake releasing position by means of a hanger assembly, the various parts of which are similar to the corresponding parts of the hanger assemblies for supporting the brake beam 5, and the parts of the hanger assemblies for supporting the brake beam 6 are designated by the same reference characters as the corresponding parts of the hanger assemblies for supporting the brake beam 5, with the distinguishing exponent 1 added thereto. Since the parts of the hanger assemblies for supporting the brake beam 6 are similar to those of the hanger assemblies for supporting the brake beam 5, it is believed that the construction of these parts will be apparent from an inspection of the drawings and from the foregoing description without further detailed description.

The hanger levers 18[1] of each hanger assembly for supporting the brake beam 6 are pivotally mounted at their upper ends on a pin or bolt 23[1], and are provided at their lower ends with a brake head 29 carrying a brake shoe 30 which is adapted to engage the tread of the associated wheel 3 in a zone located diametrically opposite to that in which the shoe 15 for such wheel is adapted to engage the tread of the wheel. Each pair of hanger levers 16[1] is provided at the upper ends of the levers with a brake head 31 carrying a brake shoe 32 which is adapted to engage the tread of the associated wheel 2 in the zone which is located diametrically opposite to that in which the shoe 26 is adapted to engage the wheel 2.

The brake mechanism also comprises means for actuating the brake beams between their brake releasing and brake applying positions to effect the application of the brakes. As here illustrated, these means include a pair of brake cylinders C which are mounted at one end of the locomotive. These brake cylinders are of similar construction, and inasmuch as they form no part of my present invention, except in so far as they are used in connection with the remainder of the brake mechanism, it is believed that for purposes of the present disclosure, it is sufficient to state that these brake cylinders each include the usual cylinder body, reciprocable piston (not shown) biased to the inner end of its stroke by the usual release spring (not shown), and a push rod 52 which is operatively connected with the piston.

The push rod 52 of each cylinder C is connected with the upper end of an associated vertically disposed brake cylinder lever 33 which is pivotally supported intermediate its ends on a transverse shaft 34, and the lower ends of the brake cylinder levers 33 are each operatively connected with an associated horizontally disposed floating lever 35 intermediate its ends by means of a pull rod 36. The transverse shaft 34 is adapted to be secured at its ends in suitable supports (not shown) mounted on the engine frame. Each pull rod 36 is provided at the end which is connected to the associated floating lever 35 with a slack adjuster 37 of well-known construction. The inner ends of the floating levers 35 are connected by means of pull rods 38 with the brake beam 7 at points equally spaced from its ends, while the outer ends of the floating levers 35 are connected by means of pull rods 39 with equalizing levers 40 at points intermediate the ends of the levers 40. Each pull rod 38 is provided at each end with a jaw which receives the associated lever 35 or brake beam 7, as the case may be, the jaw on the one pull rod 38 being made sufficiently long to completely straddle the floating lever 35 which is not connected to this pull rod.

The equalizing levers 40 are each connected at their inner ends with the brake beam 6 at points equally spaced from its ends through the medium of links 41, and at their outer ends through the medium of pull rods 42 with other equalizing levers 43 intermediate their ends. The pull rods 42 are each provided at the end which is connected to the associated equalizing lever 40 with a jaw which straddles the brake beam 6 and which receives the equalizing lever, and at the opposite end with a jaw which receives the associated equalizing lever 43.

The equalizing levers 43 are each connected at their inner ends with the brake beam 5 at points equally spaced from its ends by means of links 44 while the outer ends of these equalizing levers are each connected by means of a pull rod 45 with the brake beam 4 at points equally spaced from its ends. The pull rods 45 are provided at the ends which are connected with the equalizing levers 43 with a jaw which straddles the brake beam 5 and receives the associated equalizing lever, and at their opposite ends with a jaw which receives the brake beam 4.

When the brake cylinders are vented to atmosphere, as will normally be the case, the brake beams are held in their brake releasing positions in which they are shown in the drawings by the releasing springs mounted in the brake cylinders, and under these conditions, the brake shoes exert substantially no braking effort on the wheels.

When it is desired to apply the brakes, fluid pressure is simultaneously supplied to the two brake cylinders C, which fluid causes each of the push rods 52 to move outwardly in the associated cylinder in opposition to the bias of the release springs. This movement of the push rods acts through the linkage shown in Fig. 2 to move the brake beams 4, 5, 6, and 7 to their brake applying positions in a manner which will be readily understood from an inspection of the drawings. The movement of the brake beam 7 to its brake applying position causes the associated hanger levers 12 to rotate in a counterclockwise direction, and hence causes the brake shoes 15 secured to these levers to engage the wheels 3.

On the initial movement of the brake beam 6 to the right, the hanger levers 16¹ rotate about the trunnions 19¹ on which they are supported from the levers 18¹, and the associated brake shoes 32 move into engagement with the wheels 2.

Upon further movement of the brake beam 6 to the right, the levers 16¹ rotate about the pivotal connection between these levers and the associated brake heads 31, and thus move the levers 18¹ in a counterclockwise direction about the pins 23¹ on which they are supported from the locomotive frame. On the movement of the levers 18¹, the brake shoes 30 carried by these levers are moved into engagement with the wheels 3, and on the completion of the movement of the brake beam 6 to its brake applying position, the shoes 30 and 32 are firmly pressed against the wheels 3 and 2, respectively.

The movement of the brake beam 5 to its brake applying position acts through the hanger levers 16 and 18 to press the brake shoes 25 and 22 against the wheels 2 and 1, respectively, in the same manner that the movement of the brake beam 6 to its brake applying position acts through the hanger levers 16¹ and 18¹ to press the brake shoes 30 and 32 against the wheels 3 and 2.

The movement of the brake beam 4 to its brake applying position causes the associated hanger levers 8 to rotate in a counterclockwise direction, and hence causes the brake shoes 11 to become pressed against the wheel 1.

It will be seen, therefore, that when fluid pressure is supplied to the brake cylinders C, all of the brake shoes are pressed against the wheels, and the action of the brake mechanism is such that a substantial force effective to press any of the shoes against the wheels will not be developed until all of the shoes have been moved into engagement with the wheels with which they are associated, and thereafter the force effective to press each of the shoes against the associated wheel is approximately the same. This insures that substantially the same braking effort will be developed on each of the wheels of the locomotive.

When the fluid supplied to the brake cylinders of the brake mechanism is subsequently vented, the release springs move the push rods into the brake cylinders to their retracted positions, which movement releases the force tending to press the shoes against the wheels, and hence releases the brakes.

One advantage of brake mechanism embodying my invention is that since none of the pivotal connections for any of the brake hanger levers is located between the wheels, the minimum spacing which must be provided between the wheels is limited only to that required for the wheels to clear themselves.

Another advantage of brake mechanism embodying my invention is that the pivotal connection between the brake hangers themselves, between the brake hangers and the brake shoes, and between the brake hangers and the associated brake beams are so arranged that substantially no torsional stress is exerted on these members during an application of the brakes.

Although I have herein shown and described only one form of brake mechanism embodying my invention, it is understood that various changes and modifications may be made therein within the scope of the appended claims without departing from the spirit and scope of my invention.

Having thus described my invention, what I claim is:

1. In a brake mechanism for a vehicle having at least two longitudinally aligned wheels at one side of the vehicle arranged closely together, a first pair of hanger levers disposed on opposite sides of the closest portions of said wheels and pivotally attached at one end to the vehicle and provided at the other end with a brake shoe which is adapted to engage one of said wheels, a second pair of hanger levers disposed on opposite sides of said wheels and pivotally attached to the levers of said first pair and provided at one end with a brake shoe which is adapted to engage the other wheel, and means connected with the levers of said second pair at the ends opposite to the associated shoe for actuating the levers of both pairs to press the shoes into engagement with said wheels.

2. In a brake mechanism for a vehicle having a plurality of pairs of wheels located closely together to facilitate negotiation of curves by the vehicle, a first pair of hanger levers disposed on opposite sides of the nearest portions of two adjacent wheels at one side of the vehicle and pivotally attached at one end to the vehicle and provided at the other end with a brake shoe which is adapted to engage one of said two adjacent wheels, a second pair of hanger levers disposed on opposite sides of the contiguous portions of said two adjacent wheels and pivotally attached to the levers of said first pair and provided at one end with a brake shoe which is adapted to engage the other of said two adjacent wheels, a brake beam pivotally connected with the levers of said second pair at the ends opposite to the associated shoes, and means for moving said brake beam between brake applying and brake releasing positions to actuate the levers of both pairs.

3. In a brake mechanism for a vehicle having a plurality of pairs of wheels located closely together to facilitate negotiation of curves by the vehicle, a first pair of hanger levers disposed on opposite sides of the contiguous portions of two adjacent wheels on one side of the vehicle and pivotally attached at one end to the vehicle and provided at the other end with a brake shoe which is adapted to engage one of said two adjacent wheels, a second pair of hanger levers disposed on opposite sides of the contiguous portions of said two adjacent wheels and pivotally attached intermediate their ends to the levers of said first pair intermediate their ends and provided at one end with a brake shoe which is adapted to engage the other of said two adjacent wheels, and means connected with the levers of said second pair at the ends opposite to the associated shoe for actuating the levers of both pairs to press the shoes into engagement with the associated wheels.

4. In a brake mechanism for a vehicle having a plurality of pairs of wheels located closely together to facilitate negotiation of curves by the vehicle, a first pair of hanger levers disposed on opposite sides of the closest portions of two adjacent wheels on the same side of the vehicle and pivotally attached at their upper ends to the vehicle and provided at their lower ends with a brake shoe which is adapted to engage the tread of one of said two adjacent wheels below the closest portions of said two adjacent wheels, a second pair of hanger levers disposed on opposite sides of the closest portions of said two adjacent wheels and pivotally attached intermediate their ends to the levers of said first pair intermediate their ends and provided at their upper ends with a brake shoe which is adapted to engage the tread of the other of said two adjacent wheels above the closest portions of said two adjacent wheels, and means connected with the levers of said second pair at their lower ends for actuating the levers of both pairs to press said brake shoes into engagement with the associated wheels.

5. In a brake mechanism for a vehicle having a plurality of pairs of wheels located closely together to facilitate negotiation of curves by the vehicle, a first pair of hanger levers disposed on opposite sides of the closest portions of two adjacent wheels on the same side of the vehicle and pivotally attached at their upper ends to the vehicle and provided at their lower ends with a brake shoe which is adapted to engage the tread of one of said two adjacent wheels, a second pair of hanger levers disposed between the levers of said first pair and said two adjacent wheels and pivotally attached intermediate their ends to the levers of said first pair intermediate their ends and provided at their upper ends with a brake shoe which is adapted to engage the tread of the other of said two adjacent wheels, and means connected with the levers of said second pair at their lower ends for actuating the levers of both pairs to press said brake shoes into engagement with the associated wheels.

6. In a brake mechanism for a vehicle having a plurality of pairs of wheels located closely together to facilitate negotiation of curves by the vehicle, a first pair of hanger levers disposed on opposite sides of the closest portions of two adjacent wheels and pivotally attached at one end to the vehicle and provided at the other end with a brake shoe which is adapted to engage the tread of one of said two adjacent wheels at a zone located below the horizontal plane extending through the axes of the wheels, a second pair of hanger levers disposed on opposite sides of the closest portions of said two adjacent wheels and pivotally attached to the levers of said first pair and provided at one end with a brake shoe which is adapted to engage the tread of the other of said two adjacent wheels at a zone located above the horizontal plane extending through the axes of the wheels, and means connected with the levers of said second pair at their lower ends for actuating the levers of both pairs to press said brake shoes into engagement with the associated wheels.

7. In a brake mechanism for a vehicle having a plurality of pairs of wheels located closely together to facilitate negotiation of curves by the vehicle, a first pair of hanger levers disposed on opposite sides of the closest portions of two adjacent wheels and pivotally attached at their upper ends to the vehicle and provided at their lower ends with a brake shoe which is adapted to engage one of said two adjacent wheels at a zone located below the horizontal plane extending through the axes of the wheels, a second pair of hanger levers disposed on opposite sides of the contiguous portions of said two adjacent wheels and pivotally attached intermediate their ends to the levers of said first pair intermediate their ends and provided at their upper ends with a brake shoe which is adapted to engage the other of said two adjacent wheels at a zone located above the horizontal plane extending through the axes of the wheels, and means connected with the levers of said second pair at their lower ends for actuating the levers of both pairs to press said brake shoes into engagement with the associated wheels.

8. In a brake mechanism for a vehicle having at least one pair of wheels, two brake beams extending transversely of the vehicle on opposite sides of said pair of wheels below the horizontal plane passing through their axes, two hanger levers one located at each side of the vehicle and each comprising an upwardly extending arm secured at its lower end to a shaft journaled in the locomotive frame and a depending arm secured to said shaft at the end opposite to said upwardly extending arm, each said upwardly extending arm being provided with an offset portion which extends into the plane of the associated wheel at one side thereof above the axis of the wheel and which carries a brake shoe for engagement with the associated wheel, and said downwardly extending arms being pivotally secured to the opposite ends of one of said brake beams in supporting relation thereto, other brake shoes disposed on the opposite sides of said wheels from the shoes connected with said hanger levers and operatively connected with the other brake beam, and means for actuating said brake beams to cause said brake shoes to frictionally engage the associated wheels.

9. In a brake mechanism for a vehicle having at least one pair of wheels, two brake beams extending transversely of the vehicle on opposite sides of said pair of wheels below the horizontal plane passing through their axes, two hanger levers one located at each side of the vehicle and each comprising an upwardly extending arm secured at its lower end to a shaft journaled in the locomotive frame and a depending arm secured to said shaft at the end opposite to said upwardly extending arm, each said upwardly extending arm being provided with an offset portion which extends into the plane of the associated wheel at one side thereof above the axis of the wheel and which carries a brake shoe for engagement with the associated wheel, and said downwardly extending arms being pivotally secured to the opposite ends of one of said brake beams in supporting relation thereto, other brake shoes disposed on the opposite sides of said wheels from the shoes connected with said hanger levers and operatively connected with the other brake beam, and means for simultaneously actuating said one brake beam away from said one pair of wheels and said other brake beam toward said one pair of wheels to cause said brake shoes to frictionally engage the associated wheels.

10. In a brake mechanism for a vehicle having at least one pair of wheels, two brake beams extending transversely of the vehicle on opposite sides of said pair of wheels below the horizontal plane passing through their axes, two hanger levers one located at each side of the vehicle and each comprising an upwardly extending arm secured at its lower end to a shaft journaled in the locomotive frame and a depending arm secured to said shaft at the end opposite to said upwardly extending arm, each said upwardly extending arm being provided with an offset portion which extends into the plane of the associated wheel at one side thereof above the axis of the wheel and which carries a brake shoe for engagement with the associated wheel, and said downwardly extending arms being pivotally secured to the opposite ends of one of said brake beams in supporting relation thereto, other brake shoes disposed on the opposite sides of said wheels from the shoes connected with said hanger levers and operatively connected with the other brake beam, two floating levers connected at one end with said one brake beam at points equally spaced from its ends and at the other end with said other brake beam at points equally spaced from its ends, the point of connection of each floating lever with the one brake beam being at the opposite end of the beam from its connection with the other beam, and means for actuating said floating levers connected with said floating levers intermediate their ends.

EMIL G. MUELLER.